March 25, 1941.    A. B. NEWTON    2,236,249

DAMPER OPERATING SYSTEM

Filed March 6, 1939

Inventor
Alwin B. Newton
By George H Fisher
Attorney

Patented Mar. 25, 1941

2,236,249

UNITED STATES PATENT OFFICE 2,236,249

DAMPER OPERATING SYSTEM

Alwin B. Newton, Minneapolis, Minn., assignor to Minneapolis-Honeywell Regulator Company, Minneapolis, Minn., a corporation of Delaware Application March 6, 1939, Serial No. 260,122

10 Claims. (Cl. 236—1)

This invention relates to a damper arrangement and is applicable particularly to dampers of large size as are frequently utilized in air conditioning applications.

One of the objects of the invention is to provide a damper arrangement wherein a relatively small motive power may be utilized for controlling the position of a large damper.

More particularly, it is an object of the present invention to provide in conjunction with a damper, a small pilot or servo-damper, the position of the large damper being varied by the flow of fluid medium thereby in accordance with the adjustment of the small damper, whereby a motor which would ordinarily have insufficient power to adjust the large damper directly may be utilized.

Figure 1:
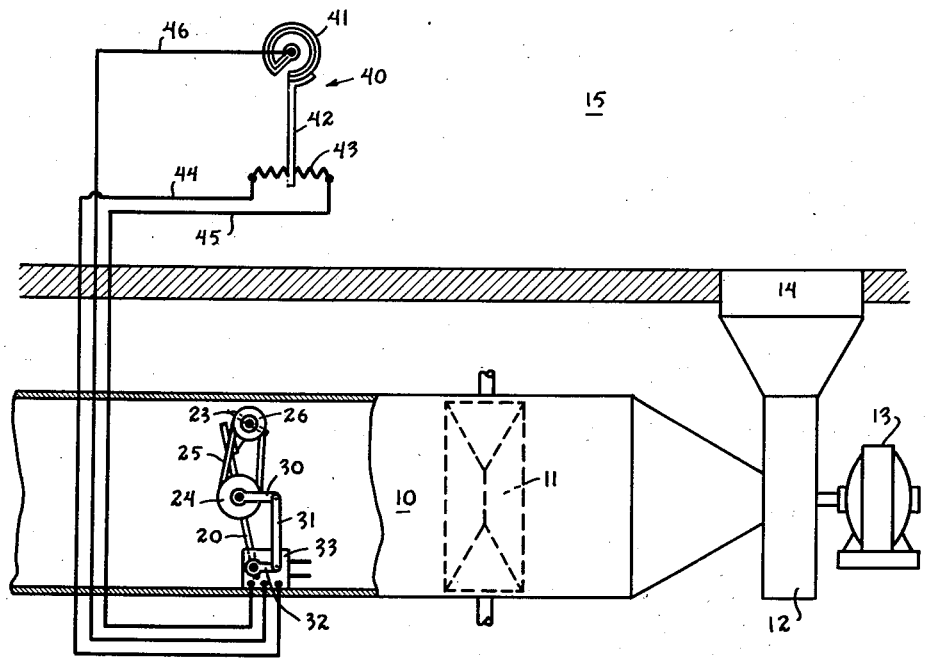
Figure 2:
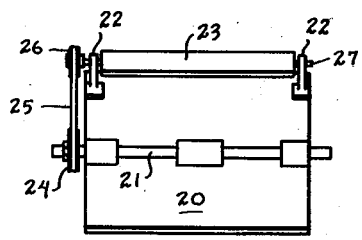

Other objects and advantages of the present invention will become apparent upon a study of the specification, claims and appended drawing wherein, Figure 1 illustrates one application of my improved damper arrangement, and Figure 2 is a view of the damper arrangement taken at right angles to that of Figure 1.

Referring more particularly to the drawing, my improved damper arrangement is shown in a typical application in an air conditioning system wherein an air conditioning chamber 10 having a suitable heating or cooling coil 11 communicates with the inlet of a fan 12 driven by a motor 13, the fan drawing air through the chamber 10 and exhausting it by way of the outlet 14 into a space 15 to be conditioned. For controlling the temperature of the space, the amount of air that flows over the coil 11 may be controlled by adjustment of the damper 20, the position of which varies the amount of air that passes through the chamber 10.

As illustrated in Figure 2, the damper 20 is mounted on a shaft 21, the damper being mounted thereon for free rotation with respect thereto. The upper part of the damper is provided with a pair of brackets 22 on which is pivotally mounted a small pilot or servo-damper 23 although it should be understood that this damper 23 may if desired be mounted on the lower part of the main damper 20. A pulley 24 is fixedly connected to the shaft 21 but free rotation between this pulley and the damper 20 which is rotatably mounted on the shaft 21 is permitted. The pulley 24 is connected by means of a belt 25 with a pulley 26 which is rigidly connected to the damper 23 by means of the shaft 27 on which the pilot damper 23 is mounted. As shown in Figure 1, the shaft 21 which carries the pulley 24 has connected thereto an arm 30 which may be connected by a link 31 to an arm 32 operated by a motor 33 which for purposes of illustration is shown as an electric motor and may be a proportioning motor of the type shown in Patent No. 2,028,110 issued to D. G. Taylor on January 14, 1936.

The motor 33 may be controlled by a thermostat 40 which responds to the temperature of the space 15 and which thermostat is shown to comprise a bimetallic element 41 controlling the position of the arm 42 carried thereby with respect to the potentiometer resistance 43 for controlling the operation of the motor 33 in a manner well known in the art. The extremities of the resistance 43 are connected to the outer terminals of the motor 33 by conductors 44 and 45 and the arm 42 is connected to the center terminal of the motor 33 through the bimetallic element 41 by means of the conductor 46. Assuming that the system is being utilized for a heating system, as the temperature in the space rises and the arm 42 is moved towards the left, for example, with respect to the resistance 43, the motor 33 will cause the arm 32 to move downwardly by an amount which is proportional to the movement of the arm 42 of the thermostat 40.

As the arm 32 moves downwardly or in a clockwise direction the link 31 will be moved downwardly thus causing rotation of the arm 30 and the pulley 24 also in a clockwise direction, this movement of the pulley 24 causing similar movement of the pulley 26 and the servo-damper 23 until this damper moves an amount which is in direct proportion with the movement of the arm 42 of the thermostat 40. Movement of the small damper 23 in a clockwise direction increases the resistance of the flow of air past the upper portion of the damper 20 and the increased pressure on this portion of the damper assembly causes movement of the main damper in a clockwise direction. The main damper carries the servo-damper with it during its movement since the servo-damper is mounted on the brackets 22 carried by the main damper, but at this time the pulley 24 will be in a fixed position assuming the motor 33 has stopped operating, and accordingly the belt connecting the two pulleys will tend to wrap around the pulley 24 and cause rotation of the pulley 26 in a direction to decrease the resistance of the flow of air past the upper portion of the damper 20, or in other words, this small damper will tend to move back towards its original position and movement of the large damper will continue until the air pressure on the upper and lower portions thereof again becomes equal to that the damper 20 will move to a position which corresponds to the adjusted position of the damper 23 or in other words, to a position which corresponds to the position of the control arm 42 of the thermostat 40.

The motor 33 may be a small motor which would have insufficient power to move the damper 20, since this motor requires only sufficient power to adjust the relatively small damper 23 and the pressure of the air or fluid flowing past the damper does the greater amount of work in moving the damper 20 to its adjusted position. Upon a decrease in temperature in the space the damper 23 would be moved in a counter-clockwise direction by the motor 33 thus decreasing the resistance to the flow of air past the upper portion of the damper 20 so that the excess pressure on the lower portion of the damper would move the large damper in a counter-clockwise direction or towards the closed position by an amount which corresponds to the adjustment of the servo-damper 23. This movement of the large damper causes the servo-damper to move back towards its former position, and the large damper will continue to move until the pressure on the upper and lower portions thereof is again equalized.

It should be understood that the small servo-damper may be utilized to operate several dampers which might be arranged side by side in the same manner. If desired the pivot of the damper 20 may be located slightly off center for the purpose of permitting easier starting of the damper from a closed position.

It will thus be seen that by my improved arrangement it is possible to control the position of a relatively large damper which normally requires a considerable amount of power to move the same by the use of a small motor which would be insufficient to move the damper if directly connected thereto.

Having described the preferred form of my invention many modifications may become apparent to those skilled in the art. For example, any suitable type of motor such as a pneumatic motor may be employed for adjusting the pilot damper, and this motor may be controlled in any suitable manner either manually or by any of suitable control means for controlling any desired condition. The damper arrangement is applicable to any type of air conditioning application or any other application wherein dampers are normally employed to control the flow of a fluid medium through a conduit or opening and the application herein shown and described is merely for purposes of illustration. Also any suitable means may be employed for connecting the shafts 21 and the damper 23 in place of the belts and pulleys, as for example any suitable form of gearing which would give the same results. It should therefore be understood that my invention is limited only by the scope of the appended claims.

I claim as my invention:

1. In a device for controlling the flow of a fluid medium through a conduit, a large damper pivotally mounted within said conduit, a small damper pivotally carried by the large damper adjacent one end thereof, said small damper varying the effect of the fluid medium on the large damper for positioning said large damper, a pulley connected to the small damper, a pulley pivotally mounted adjacent the pivot of the large damper, belt means connecting said pulleys, and means for adjusting the position of the last named pulley and maintaining said pulley fixed in its adjusted position for causing movement of the large damper following adjustment of said small damper to readjust said small damper.

2. In a damper structure of the class described, a main damper for controlling the flow of fluid medium through a conduit, shaft means on which said main damper is pivotally mounted, a pulley fixedly mounted on said shaft means, pilot damper means carried by and rotatable with respect to said main damper, said pilot damper means varying the effect of the fluid medium on the main damper for positioning said main damper, a pulley rigidly connected to said pilot damper means, and means for maintaining said first pulley in selectively different fixed positions.

3. In a device for controlling the flow of a fluid medium through a conduit, a flow controlling damper, means rotatably mounting said damper within the conduit, means carried by the damper for varying the resistance to flow of fluid between one edge of the damper and the adjacent wall of the conduit whereby movement of the damper is caused by the flow of fluid, and means caused by movement of said damper for readjusting said resistance varying means so that the damper comes to rest in a new position corresponding to the original adjustment of the resistance varying means.

4. In a device for controlling the flow of a fluid medium through a conduit, main damper means for controlling the flow of said medium through said conduit, said main damper means being arranged to move under the action of a force produced by the velocity of said medium through said conduit, pilot damper means for controlling the application of said force to said main damper means, means including a controller for actuating said pilot damper means to cause movement of said main damper means, and means actuated upon movement of said main damper means for causing movement of said pilot damper means in a manner to stop movement of said main damper means when its position corresponds to the position of said controller.

5. In a device for controlling the flow of a fluid medium through a conduit, main damper means for controlling the flow of said medium through said conduit, said main damper means being arranged to move under the action of a force produced by the velocity of said medium through said conduit, pilot damper means for controlling the application of said force to said main damper means, means including an adjustable controller for actuating said pilot damper means to vary the effect of said force on said main damper means for causing movement of said main damper means upon adjustment of said controller, and means influenced by movement of said main damper means for varying the effect of said force in the opposite direction.

6. In a device for controlling the flow of a fluid medium through a conduit, main damper means for controlling the flow of said medium through said conduit, said main damper means being arranged to move under the action of a force produced by the velocity of said medium through said conduit, pilot damper means for controlling the application of said force to said main damper means, means including an adjustable controller for moving said pilot damper means from an initial position to thereby change the magnitude of said force and cause movement of said main damper means, and means actuated upon movement of said main damper means for moving said pilot damper means back towards said initial position.

7. In a device for controlling the flow of a fluid medium through a conduit, a main damper for controlling the flow of fluid medium through said conduit, a pilot damper pivotally mounted on said main damper, said pilot damper utilizing the velocity of the fluid medium for actuating the main damper, and means for positioning said pilot damper, said positioning means including a controller for actuating said pilot damper from an initial position and follow up means actuated upon movement of the main damper for moving said pilot damper back towards such initial position.

8. In a device for controlling the flow of a fluid medium through a conduit, a main damper for controlling the flow of fluid medium through said conduit, a small damper pivotally connected to said main damper, said small damper varying force applied to said main damper by the velocity of the medium flowing through the conduit for causing change in position of said main damper, means for adjusting the small damper with respect to the main damper, and follow up means actuated upon movement of the main damper for moving said small damper back towards its original position.

9. A device for controlling the flow of a fluid medium through a conduit, including in combination, main damper means in said conduit, pilot damper means for controlling the position of said main damper means, said pilot damper means being exposed to the flow of fluid in said conduit and operatively connected to said main damper means so as to transmit thereto a positioning force due to the velocity of the medium flowing through the conduit, motor means for changing the position of said pilot damper means so as to vary the value of said force, and means for controlling said motor.

10. A device for controlling the flow of a fluid medium through a conduit, including in combination, main damper means in said conduit, said main damper means being biased for movement in one direction, pilot damper means for controlling the position of said main damper means, said pilot damper means being exposed to the flow of fluid in said conduit and operatively connected to said main damper means so as to transmit thereto a force due to the velocity of the medium flowing through the conduit, said force opposing said bias, motor means for changing the position of said pilot damper means so as to vary the value of said force, and means for controlling said motor.

ALWIN B. NEWTON.